Feb. 1, 1955
K. LOWE
2,700,892
WHEEL BALANCING RACK
Filed Dec. 3, 1951
3 Sheets-Sheet 1
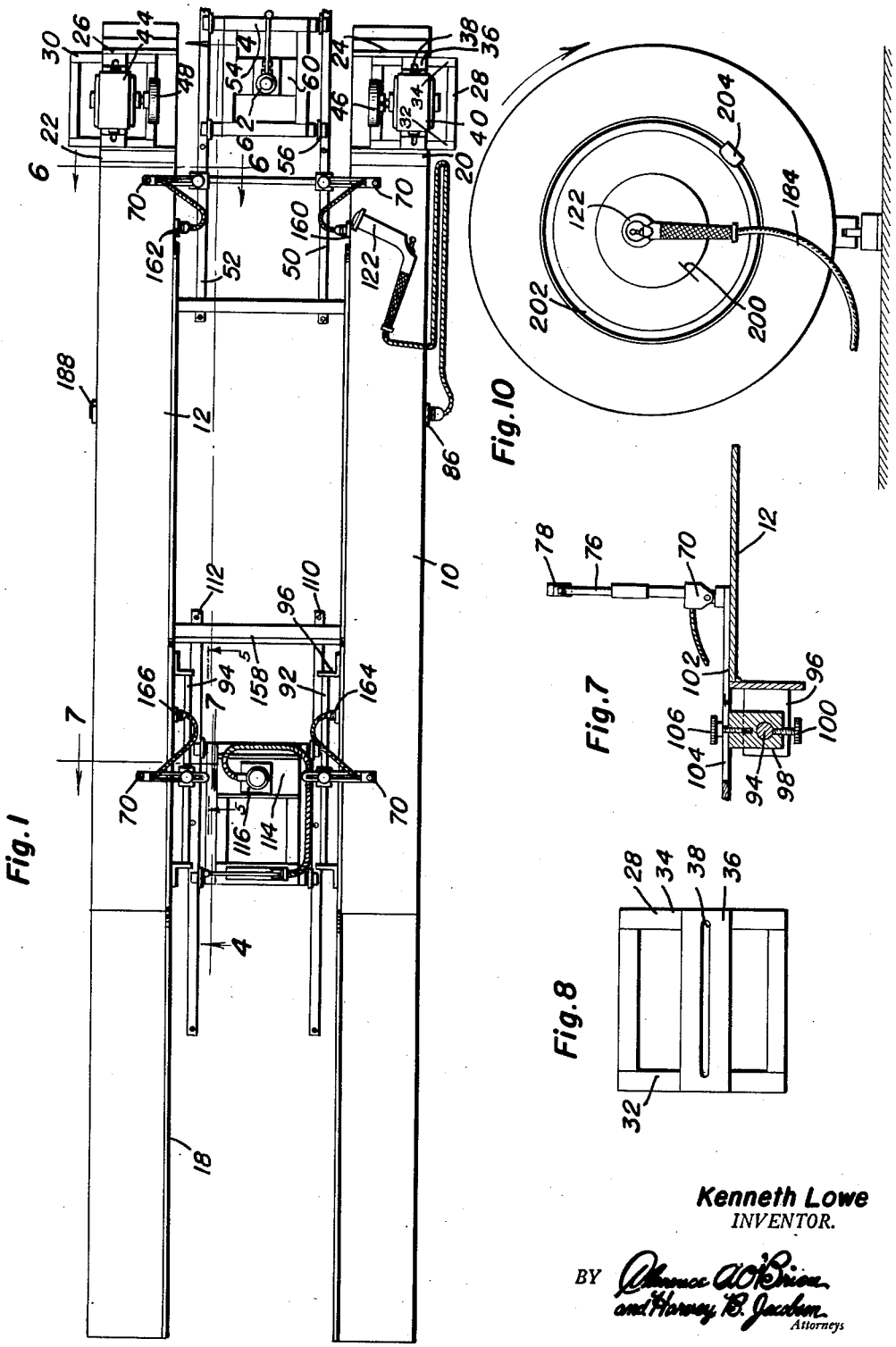
Kenneth Lowe
INVENTOR.
BY *Clarence A. O'Brien*
*and Harvey B. Jacobson*
Attorneys

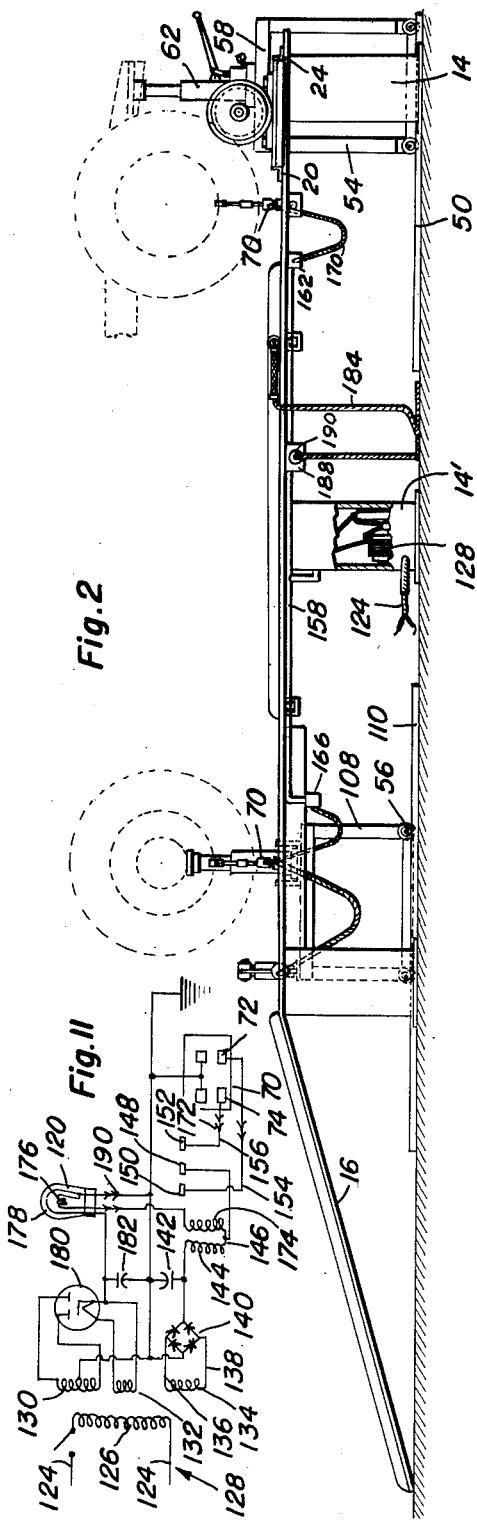

Feb. 1, 1955 K. LOWE 2,700,892
WHEEL BALANCING RACK
Filed Dec. 3, 1951 3 Sheets-Sheet 3
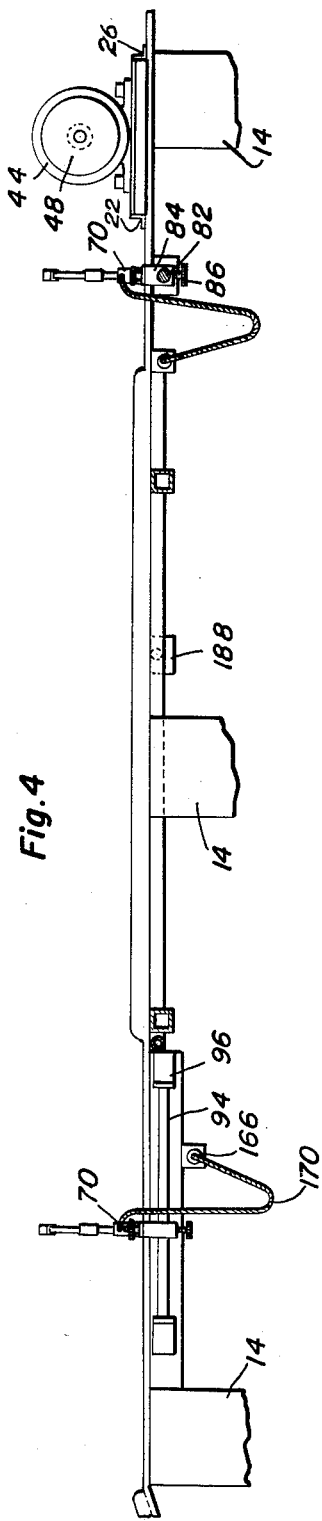
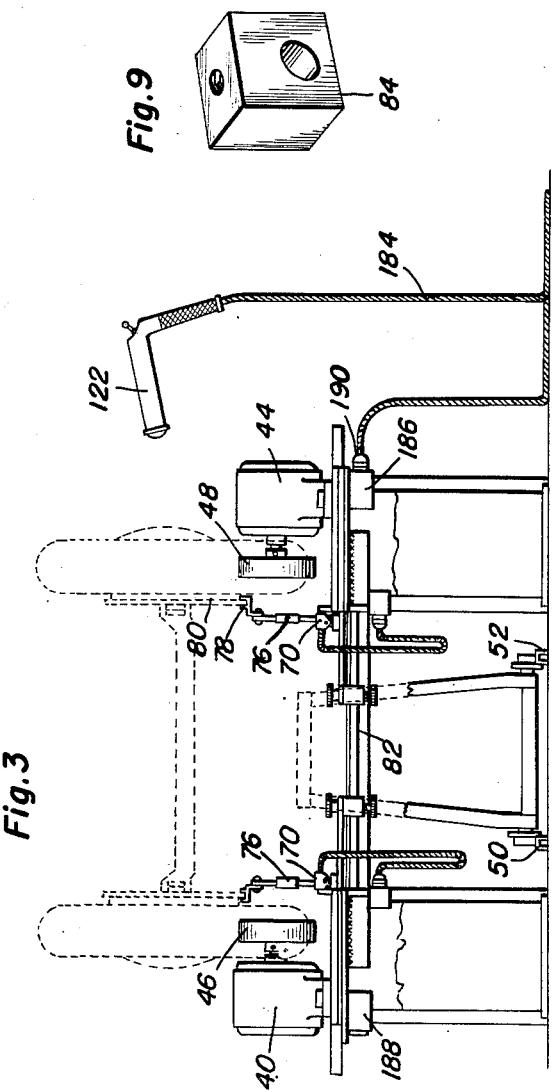
Kenneth Lowe
INVENTOR.

United States Patent Office 2,700,892
Patented Feb. 1, 1955

2,700,892

WHEEL BALANCING RACK

Kenneth Lowe, East Alton, Ill., assignor of one-half to Harry W. Ringering, East Alton, Ill.

Application December 3, 1951, Serial No. 259,547

6 Claims. (Cl. 73—66)

This invention relates to a wheel balancing rack and particularly to a wheel balancing rack for balancing all of the wheels of an automotive vehicle while on the vehicle.

In the operation of automotive vehicles it is desirable to balance the individual wheels for both static and dynamic balance in order to get a smooth comfortable ride in the vehicle. Heretofore it has been customary to remove the wheels from the vehicle and place them on a special device for accomplishing the balancing. It has been proposed to use a stroboscope light and a vibration pick-up switch in contact with the wheel to balance the wheels while on the vehicle. It has heretofore been necessary to transport the equipment from wheel to wheel and to balance the wheels individually.

The present invention provides a rack on which an automotive vehicle may be mounted and having various portions of the equipment placed on the rack so that the wheels may be selectively engaged and the equipment may be used with any wheel so that all wheels of the vehicle may be expeditiously balanced without removing any of the wheels from the vehicle.

This is accomplished by providing a rack with a pair of spaced tracks on which any vehicle may be supported. Vibration pick-up switches are placed adjacent each of the wheel positions and means are provided so that the pick-up switches may be adjusted into contact with the wheel. Also means are provided by which a jack may be shifted relative to the vehicle and any wheel of the vehicle may be lifted clear of the track after which the vibration switch is adjusted thereto and connected into a controller circuit of a stroboscopic lamp which can be trained on any wheel of the vehicle. The rack will also be provided with motive means for spinning the front wheels of the vehicle while the rear wheels of the vehicle will be spun one at a time by the motive power of the vehicle.

It is accordingly an object of this invention to provide an improved wheel balancing rack.

It is a further object of this invention to provide a balancing system in which a portion of the equipment may be utilized on all wheels.

It is a further object of this invention to provide a rack in which the balancing equipment may be mounted for expeditious and efficient use.

A further object of this invention is to provide a wheel balancing rack having means for selectively connecting any of the portions of the system into service.

Other objects and many of the attendant advantages of this invention will be apparent from the following detailed description taken in conjunction with the accompanying drawing in which:

Figure 1 is a top plan view of the wheel balancing rack;

Figure 2 is a side elevational view of the wheel balancing rack with parts broken away and in section, and showing wiring connection;

Figure 3 is a front elevational view of the balancing rack with portion broken away to show the location of interior parts;

Figure 4 is a longitudinal section taken substantially on the plane indicated by the line 4—4 of Figure 1 and particularly shows the method for adjusting the vibration pick-up switch;

Figure 5 is an enlarged detail view taken substantially on the plane indicated by the line 5—5 of Figure 1 showing the longitudinal adjustment of the rear wheel vibration pick-up switch;

Figure 6 is an enlarged view taken substantially on the plane indicated by the line 6—6 of Figure 1 and showing the means for laterally adjusting the front wheel vibration pick-up switch;

Figure 7 is an enlarged view taken substantially on the plane indicated by the line 7—7 of Figure 1 and showing the means for laterally adjusting the rear wheel vibration pick-up switch;

Figure 8 is an enlarged view of the slide for adjusting the position of the front wheel spinning motor;

Figure 9 is a perspective view of a slide bar;

Figure 10 is a schematic illustration of the use of a stroboscopic lamp; and

Figure 11 is a circuit diagram of the electrical connection.

The exemplary embodiment of the invention according to the drawings includes a pair of parallel tracks 10 and 12 which are elevated above the floor a convenient distance by a plurality of columns 14. At least one of the columns 14' is made hollow for a purpose presently to be described.

Inclined tracks 16 and 18 are connected to one end of the tracks 10 and 12 so that a vehicle may be driven up onto the tracks 10 and 12. The tracks 10 and 12 are of sufficient length to accommodate any vehicle the wheels of which it is intended to balance. Preferably the tracks 10 and 12 are provided with stops 20 and 22 for aligning the front wheels of the vehicle at a predetermined point on the rack. Stops 20 and 22 form one portion of a transverse slide having a forward portion 24 and 26 providing a pair of transverse tracks or guides across the tracks 10 and 12. Slide frames 28 and 30 have side bars 32 and 34 for engagement with the stops 20 and 24 or 22 and 26. A mounting plate 36 on each of the slide frames 28 and 30 is provided with a slot 38 so that motors 40 or 44 may be mounted on the plate 36 and adjusted longitudinally of the tracks 10 or 12 by means of the slot 38. The motors 40 and 44 are provided with spinning wheels 46 and 48 which are adapted to be pressed against the tire of the front wheels of a vehicle mounted on the tracks 10 and 12.

Mounted between the tracks 10 and 12 adjacent the position of the front wheels of the vehicle thereon, are a pair of guide rails 50 and 52. The carriage 54 has two pairs of wheels 56 engaging the guide rails 50 and 52 so that the carriage may be longitudinally moved with respect to the tracks 10 and 12. The top 58 of the carriage 54 is provided with a transverse trackway 60 in which is mounted the hydraulic jack 62.

It will be apparent that the carriage 54 may be adjusted as desired with relation to a vehicle mounted on the rack and the jack can be slid laterally with respect to the tracks 10 and 12 in the guideway 60 so that the jack 62 can be applied to the frame of the vehicle on the tracks so that either of the front wheels of the vehicle may be selectively lifted out of engagement with the track. After the wheel is lifted out of engagement with the track the frame 28 or 30 is adjusted in the transverse tracks and the appropriate motor 40 or 44 is adjusted in the longitudinal slots 38 so that either the spinning wheel 46 or 48 is in contact with the elevated vehicle wheel so that it may be spun at high speed by the appropriate motor.

Pick-up switches 70 are mounted on a rack adjacent each of the wheel positions for a vehicle mounted thereon. Vibration switch 70 has a plurality of pairs of contacts 72 and 74 and a reciprocating and oscillating arm 76 which carries bridging members for bridging either the contacts 72 or 74 depending on the character of the vibration transmitted thereto by the wheel undergoing balancing. If the wheel is statically unbalanced then there will be a reciprocating action transmitted to the pick-up arm 78 which engages a portion such as 80 of the spinning wheel being inspected. Preferably the arm 78 is connected to a portion such as the rim of the brake drum 80. However, it is obvious that any fixed portion of the wheel can be utilized. The static unbalance producing reciprocation of the arm 76 causes the bridge of the contact to close the contact 72 while the dynamic unbalance causes the oscillatory motion of the arm 78 which causes an oscillatory motion of the arm 76 which closes the bridging contact to close the contact 74.

In order to adjust their switches 70 in the contact with the front wheels of the vehicle, adjustment bar 82 is provided extending transversely of the tracks 10 and 12 and has adjusting block 84 slidably mounted thereon and locked in position at any desired point on the rod 82 by means of a thumb screw 86. Arms 88 are attached to the block 84 by means of a thumb screw 90. Obviously, by operating the thumb screw 86 the block 84 may be loosened to slide if desired along the rod 82 so that the switch 80 is in proper position for the arm 78 to engage the rim 80 of the hub of the wheel of the vehicle being adjusted. Any slight longitudinal adjustment can be secured by loosening the thumb screw 90 and angularly displacing the arm 88 to bring the switch 70 into the exact location desired with respect to the wheel being tested.

Since automotive vehicles are of various lengths the rear wheels of the vehicle being tested may fall over a material distance on the racks 10 and 12. Therefore, longitudinally extending bars 92 and 94 have been attached to the tracks 10 and 12 by suitable brackets 96. Suitable blocks 98 very similar to the block 84 are mounted on the rods 94 and 92 and are adjustable thereon by loosening the thumb screw 100. The respective switch 70 is mounted on an arm 102 which is provided with a slot 104 to receive the thumb screw 106. It will be apparent that the switch 70 may be adjusted longitudinally along the track by sliding the blocks 98 on the rods 92 and 94 and securing it in adjusted position by tightening the thumb screw 100. Likewise the lateral adjustment of the switch 70 may be achieved by loosening the thumb screw 106 and sliding the rod 102 across the top of the tracks 10 or 12 and then tightening the thumb screw 106 when it is desirable to retain the switch in the appropriate position.

A carriage 108 is mounted on guide rails 110 and 112 secured between and substantially parallel with the tracks 10 and 12. The carriage 108 is provided with wheels 56 and a transverse track way 114 in which is mounted a hydraulic jack 116. It will be seen that by adjusting the carriage 108 and sliding the jack 116 in the transverse trackway 114 it is possible to adjust the jack to either of the back wheels of the vehicle and selectively lift either of the back wheels of the vehicle out of contact with the track 10 or 12.

The back wheels of the vehicle are spun by starting the motor of the vehicle so that the elevated wheel will be spun very rapidly.

A stroboscopic lamp 120 is mounted in a carrier 122. An electrical supply circuit 124 is connected with the primary 126 of a suitable transformer indicated at 128 to provide the source of electric current for the stroboscopic lamp 120. The transformer 128 is provided with a plurality of secondary windings 130, 132 and 134. Winding 134 has terminals 136 and 138 connected to a bridge type rectifier 140 having a stabilizing capacity 142 connected across the output terminals of the rectifier 140. One terminal, preferably the negative terminal, is connected to ground. The other terminal, preferably the positive terminal, is connected to the primary winding 144 of a high voltage impulse coil 146. The other end of the winding 144 is connected to the switch terminal 148 and may be connected either to the terminal 150 or 152 to which are connected circuit wires 154 and 156. The circuit wires 154 and 156 are enclosed in conduit 158 and are connected to the outlet boxes 160, 162, 164 and 166 which are located respectively at the various wheel positions on the tracks 10 and 12. The switches 70 are provided with flexible cables 170 which have terminal plugs 172 which can be engaged with the outlets 160, 162, 164 and 166 so that the outlets 160 to 166 and the plugs 172 provide separable connectors by which the switches 70 may be selectively connected to the impulse coil 146. The bridging of the contacts 72 or 74 of the selected switch 70 produces a high voltage in the secondary winding 174 of the impulse coil 146. The output terminal of the winding 174 is connected to the filament 176, of the stroboscopic lamp 120. The high voltage impulses from the winding 174 produce momentary flashes of great intensity of light from the stroboscopic lamp 120. In order to permit proper aiming of the carrier 122 an auxiliary filament 178 is provided in the lamp 120.

The auxiliary filament 178 is fed from a full wave rectifier 180 supplied from the winding 130 and having a stabilizing capacity 182 connected across the output terminals thereof. To permit proper adjustment of the lamp 120 with respect to the wheels being tested the holder 122 is mounted on a flexible cable 184 which may be of sufficient length that the lamp may be carried about and adjusted in position to any of the wheels of the vehicle being tested. However, it is preferred to provide a portion of the circuit between the controller and the lamp 120 as a wiring embedded or mounted on the rack and having terminals 186 and 188 which provide the base of a separable connector into which is connected the plug 190 of the cable 184. This way the lamp holder 122 may be carried to either side of the rack and plugged into the terminal 186 or 184 so that it may conveniently be utilized in cooperation with any of the wheels being tested.

In the operation of the rack, the vehicle is driven onto the tracks 10 and 12 until the front end is in a desired position. Switches 70 are adjusted in proximity with the various wheels of the vehicle and the jacks 52 and 116 are brought into the proper position to selectively raise the desired wheel. The separable connector 170 of the proper switch 70 is plugged into the control circuit and the wheel spun at high speed either by the motors 40 or 44 or by the motor of the vehicle. The particular variety of unbalance found in a wheel will cause contact with either of the contacts 72 or 74. These contacts will cause flashing of the lamp 120. In order to utilize the flashes of the stroboscopic lamp 120 a mark 200, which may conveniently be a chalk mark, is placed on the wheel to be tested and the flashing of the lamp shows the mark to apparently stand still in some position on the wheel. The auxiliary filament 178 provides a spot which may be centered on the wheel so that the stroboscopic lamp will constantly be in proper orientation to the wheel being tested. Assuming that the heavy spot on the wheel is at the point 202 then the stroboscopic lamp will make the chalk mark apparently stand still at a point 90° ahead of the heavy spot. When the location of the spot is located the wheel is stopped and the chalk mark brought to that exact position. Weight 204 is applied diametrically opposite from the heavy spot 202, and for static unbalance the weight 204 is divided and placed on opposite sides of the rim.

It will thus be seen that there has been provided a rack having means for efficiently and accurately adjusting the unbalance of all wheels of the vehicle without removing them from the vehicle and while they are in a position in which they will be utilized. The single control equipment is connected to any of the various wheels while the stroboscopic lamp may be used in cooperation with any wheel being tested.

While for the purposes of exemplification a particular embodiment of the invention has been shown and described according to the best present understanding, it will be apparent that changes and modifications can be made therein without departing from the true spirit of invention.

Having described the invention, what is claimed as new is:

1. A wheel balancing rack comprising a pair of parallel tracks adapted to support an automotive vehicle, a vibration pick up switch located adjacent each of the several wheel positions of a vehicle supported on said rack, guide rails fixed between said tracks, a pair of carriages mounted on said guide rails for longitudinal movement between said tracks, there being transverse trackways on said carriages, jack means mounted in said trackways whereby said jack means are adjustable for selectively elevating any wheel of said vehicle out of contact with said tracks, means for adjusting the vibration pick up switches into operative position with the several wheels, a strobo-light, circuit means for supplying energy for said strobo-light, said circuit means including an impulse coil for applying said energy to said strobo-light, and means for selectively connecting said pickup switches in circuit with said impulse coil.

2. A wheel balancing rack comprising a pair of parallel tracks, a plurality of hollow columns maintaining said tracks in an elevated relation, said tracks being adapted to support an automotive vehicle thereon, means to locate the front wheels of a vehicle on said tracks, vibration pick up switches mounted on said rack adjacent each wheel position, a pair of carriages mounted between said tracks, guide rails for each of said carriages, there being a transverse trackway on each of said carriages, a jack located in each of said trackways whereby any wheel of a vehicle can be selectively elevated out of contact with said tracks, means for selectively adjusting each of said vibration switches into contact with the elevated wheel, a stroboscopic light, a source of electrical energy for said light, impulse circuit means for applying energy to said light, and means in said circuit for selectively connecting each of said vibration pick up switches in said impulse circuit means.

3. A wheel balancing rack comprising a pair of parallel tracks, a plurality of hollow columns maintaining said tracks in an elevated relation, said tracks being adapted to support an automotive vehicle thereon, means to locate the front wheels of a vehicle on said tracks, vibration pick up switches mounted on said rack adjacent each wheel position, a pair of carriages mounted between said tracks, guide rails for each of said carriages, there being a transverse trackway on each of said carriages, a jack located in each of said trackways whereby any wheel of a vehicle can be selectively elevated out of contact with said tracks, means for selectively adjusting each of said vibration pick up switches into contact with the elevated wheel, a stroboscopic light, a source of electrical energy for said light, an impulse coil including primary and secondary windings for applying energy from said source to said light, and means for selectively connecting each of said vibration pick up switches in series circuit relation with said primary winding, said primary winding being housed in one of said hollow columns.

4. A wheel balancing rack comprising a pair of parallel tracks, stop members arranged transversely of each of said tracks adjacent one end of said tracks, said stop members forming one side of a transverse guide across each of said tracks, a forward stop spaced from each of said first-mentioned stops constituting the other side of said transverse guides, a slide frame mounted in said transverse guides, a mounting plate on said slide frame, said mounting plate including a slot extending parallel to said tracks, a motor slidably mounted in said slot for adjustment on said plate, and a spinning wheel mounted in driven relation to said motor.

5. A wheel balancing rack comprising a pair of parallel tracks, stop members arranged transversely of each of said tracks adjacent one end of said tracks, said stop members forming one side of a transverse guide across each of said tracks, a forward stop member spaced from each of said first-mentioned stops and constituting the other side of said transverse guides, a slide frame mounted in each of said transverse guides, a mounting plate on said slide frame, said mounting plate including a slot extending parallel to said tracks, a motor slidably mounted in said slot for adjustment on said plate, a spinning wheel mounted in driven relation to said motor, and a lifting jack mounted for longitudinal and transverse adjustment between said tracks, said jack being adapted to present a wheel of a vehicle for engagement by said spinning wheel.

6. A wheel balancing rack comprising a pair of parallel tracks, stop members arranged transversely of each of said tracks adjacent one end of each of said tracks, said stop members forming one side of a transverse guide across each of said tracks, a forward stop member spaced from each of said first-mentioned stops and constituting the other side of said transverse guides, a slide frame mounted in each of said transverse guides, a mounting plate on said slide frame, said mounting plate including a slot extending parallel to said tracks, a motor slidably mounted in said slot for adjustment on said plate, a spinning wheel mounted in driven relation to said motor, a lifting jack mounted for longitudinal and transverse adjustment between said tracks, said jack being adapted to present a wheel of a vehicle for engagement by said spinning wheel, and a vibration pickup switch mounted on said rack for longitudinal and transverse adjustment thereon, said switch being adapted for actuation by a vehicle wheel engaged by said spinning wheel.

References Cited in the file of this patent

UNITED STATES PATENTS

| Number | Name | Date |
|---|---|---|
| 2,076,759 | Atti et al. | Apr. 13, 1937 |
| 2,141,639 | Catalano | Dec. 27, 1938 |
| 2,341,444 | Hunter, Jr. | Feb. 8, 1944 |
| 2,344,349 | Forster | Mar. 14, 1944 |
| 2,363,316 | Hagg | Nov. 21, 1944 |
| 2,378,631 | Holmes | June 19, 1945 |